June 24, 1924.
J. L. TILLOTSON
COMPUTING SCALE
Filed Sept. 11, 1922
1,498,938
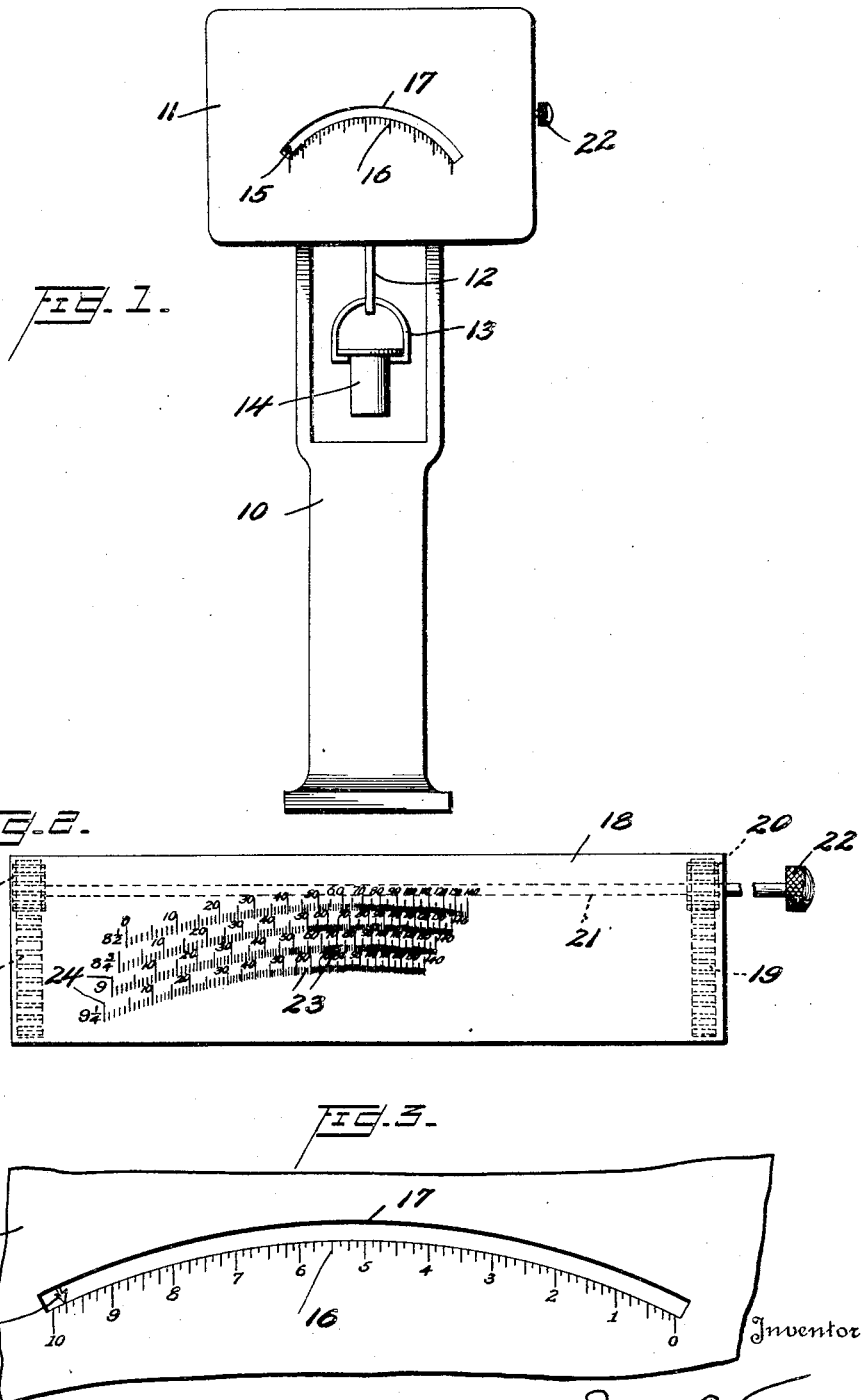

Patented June 24, 1924.

1,498,938

UNITED STATES PATENT OFFICE.

JOHN L. TILLOTSON, OF NEWARK, NEW JERSEY.

COMPUTING SCALE.

Application filed September 11, 1922. Serial No. 587,503.

*To all whom it may concern:*

Be it known that I, JOHN L. TILLOTSON, a citizen of the United States, residing at Newark, Essex County, State of New Jersey, have invented certain new and useful Improvements in Computing Scales, of which the following is a specification.

The present invention relates to scales and particularly to scales adapted to be used by manufacturers of ice cream for determining the exact percentage of overrun at any time during a freezing operation.

It is essential, where ice cream is being manufactured in large quantities simultaneously in a number of individual machines, to have the overrun realized by the several machines practically the same, in order to insure a substantially uniform factory product. The overrun is the increase in volume of the ice cream over the original ingredients introduced into the machine and often amounts to 100% or more, that is, the volume of ice cream is twice as great as the volume of the mixture introduced into the freezer. The percentage of overrun is calculated by means of the following formula:

$$\frac{Wt.\ of\ 1\ gal.\ mix - wt\ 1\ gal.\ ice\ cream}{Wt.\ of\ 1\ gal.\ ice\ cream} = 100\%\ overrun.$$

The overrun fluctuates within wide limits if not carefully regulated. If the percentage of overrun is too low, the ice cream resulting is of inferior quality, being heavy and of inferior taste; where the percentage of overrun is too large, the resulting ice cream is coarse, has a flat taste, and has inferior lasting qualities for storage purposes.

Various devices have heretofore been designed or suggested for enabling the attendant to quickly determine the percentage of overrun in a particular machine at any time but such devices are generally inconvenient to use and have not proven satisfactory in practice. In accordance with the present invention a scale is provided by means of which the operator of an ice cream freezer may test the overrun in a minimum of time and without calculation or manipulation of an adjustable container such as employed in certain prior types of overrun testing machines. The present device is extremely simple, inexpensive, easily operated, and accurate in use.

It may be made in various forms and in the accompanying drawings one form of the invention is illustrated.

Fig. 1 is a front elevation of a scale embodying the invention;

Fig. 2 is a front elevation of a card having inscribed thereon a number of overrun percentage scales, and showing the means for operating the same;

Fig. 3 is an enlarged view of the center portion of the face of the machine showing a slot through which the card illustrated in Fig. 2 may normally be observed.

The details of construction of the weighing mechanism are not illustrated and may be of any selected type which will give an accurate reading of the weight of a cup of ice cream suspended therefrom. The stand of the sale is indicated at 10 and this stand supports the elevated casing 11 in which the scale mechanism is contained. Connected to the scale levers is a vertical depending hook 12 from which hangs a yoke 13 which may receive a cup or container 14. A movable pointer is indicated at 15 and a scale reading in pounds at 16, the arrangement being such that the pointer 15 indicates on scale 16 the exact weight of the contents of cup 14.

Scale 16 may be conveniently divided into subdivisions of one-tenth of a pound and cup 14 may have a cubic content of one-tenth of a gallon so that the pointer will indicate on the scale 16 the weight of the ice cream or the mixture, as the case may be, in pounds per gallon. Positioned in rear of the curved slot or view opening 17 immediately above scale 16 is a vertically movable card 18. This card has mounted on its rear racks 19 which mesh with pinions 20 on a shaft 21 which projects through the side wall of casing 11 and has on its outer end a knurled operating handle 22. Rotation of handle 22 by hand causes vertical movement of card 18 so that any one of the scales 23 inscribed thereon may be brought into register with the view opening 17 so that it may be perceived from the front.

The scales 23 are similar and indicate percentages of overrun but it will be seen that they are in stepped arrangement. The lowermost scale 23 is to be used where the mixture to be frozen initially weights 9½ pounds per gallon, the scale immediately above this, 9¼ pounds per gallon, etc.

In operation in testing the overrun of a machine the weight in pounds per gallon of the original mixture is first determined by filling cup 14 level with its brim and noting the position of the pointer 15 when the cup is hung from the weighing mechanism. If this weight is found to be 9 pounds per gallon, for instance, the card 18 is dropped until the middle scale 23 is in rear of the view opening 17 and in such case its zero mark 24 will be directly aligned with the "9" division mark of scale 16. The process of freezing is then carried on and after the mixture has been frozen, a test may be made by filling the cup 14 with the ice cream and suspending it from the yoke 13. If the volume has been doubled, the pointer will indicate a weight of 4½ pounds per gallon and the pointer will overlie the "100" division on the middle scale 23 showing that the overrun is 100%.

This percentage will be automatically found for all amounts of overrun, the pointer indicating directly the weight per gallon on scale 16 and the percentage of overrun on one of the scales 23. A scale 23 is, of course, always positioned behind the view aperture 17 which has a zero mark 24 which corresponds to the weight per gallon of the mixture before freezing. In practice the lines 24 are inscribed in red and the remainder of each scale in a different color, and the operator when weighing the mixture merely moves the card 18 until one of the red lines 24 is coincident with or closely adjacent the pointer 15. As the machine gives not only the percentage of overrun, but also the actual weight in pounds per gallon of the contents of the cup, the use of additional scales in the freezing room is avoided.

While I have shown in the drawings only a few percentage scales 23, for the sake of clearness, it will be realized that for greater accuracy the number of scales should be increased, so that one of the red lines may always be brought exactly opposite the pointer. A large number of such percentage scales may involve the use of a card of inconveniently large size, and the use of a rotating cylinder on which the scales may be mounted will suggest itself. Obviously other changes may be made in the design and arrangement of the component parts of the invention without departing from its scope.

Having thus described my invention, what I claim as new and desire to secure by Letters Patent is:

1. A weighing apparatus for ice cream manufacturers for ascertaining the percentage of overrun, comprising a scale mechanism for indicating the weight per unit volume of the ice cream mixture before and after freezing including a pointer and a cup of fixed volumetric capacity, a series of scales for indicating the percentage of overrun corresponding to a progressive series of weights per unit volume of unfrozen mixtures, and means for bringing the scale corresponding to the mixture in the cup in registry with the pointer, whereby the percentage of overrun is directly indicated.

2. A weighing apparatus for ice cream manufacturers for ascertaining the percentage of overrun, comprising a scale mechanism for indicating the weight per unit volume of the ice cream mixture before and after freezing including a pointer and a cup of fixed volumetric capacity, a series of scales for indicating the percentage of overrun corresponding to a progressive series of weights per unit volume of unfrozen mixtures, means for bringing the scale corresponding to the mixture in the cup in registry with the pointer, and a scale for indicating the weight per unit volume of the mixture in the cup, whereby the weight per unit volume and the percentage of overrun are directly and simultaneously indicated.

3. A weighing apparatus for ice cream manufacturers for ascertaining the percentage of overrun, comprising a scale mechanism for indicating the weight per unit volume of the ice cream mixture before and after freezing including a pointer and a cup of fixed volumetric capacity, and overrun indicating scale means, adjustable to correspond to the weight per unit volume of the unfrozen mixture, associated therewith for cooperating with the scale mechanism for indicating directly the percentage of overrun.

4. A weighing apparatus for ice cream manufacturers, comprising in combination a scale mechanism for indicating the weight per unit volume of the ice cream mixture before and after freezing, and a direct reading overrun percentage indicating mechanism, whereby the weight per unit volume of ice cream and the percentage of overrun may be obtained directly and simultaneously.

5. An apparatus for indicating a value dependent upon the change in density of a material, comprising a weighing mechanism having a cup adapted to contain a fixed volume of the material and a pointer for indicating the weight per unit volume of the material in the cup, a series of scales for indicating the change in density corresponding to a progressive series of initial densities, and means for bringing the scale corresponding to the initial density of the material in the cup into registry with the pointer.

In testimony whereof I hereunto affix my signature.

JOHN L. TILLOTSON.

Witness:
DAVID D. FORMAN.